(12) United States Patent
Sakurai (10) Patent No.: US 7,153,012 B2
(45) Date of Patent: Dec. 26, 2006

(54) CAP FOR VEHICLE HEADLAMP AIMING MECHANISM

(75) Inventor: Nobuyoshi Sakurai, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 70 days.

(21) Appl. No.: 10/964,424

(22) Filed: Oct. 13, 2004

(65) Prior Publication Data

US 2005/0083705 A1    Apr. 21, 2005

(30) Foreign Application Priority Data

Oct. 17, 2003   (JP) ............................ 2003-358241

(51) Int. Cl.
*F21V 19/02*    (2006.01)

(52) U.S. Cl. .................. 362/523; 284/418; 284/507; 284/529

(58) Field of Classification Search .............. 362/275, 362/284, 419, 460, 523, 524, 530–532, 538, 362/546

See application file for complete search history.

(56) References Cited

U.S. PATENT DOCUMENTS

| | | | |
|---|---|---|---|
| 5,647,659 A | * | 7/1997 | Mori .......................... 362/529 |
| 5,951,157 A | | 9/1999 | Shirai et al. |
| 6,017,137 A | | 1/2000 | Suehiro et al. |
| 6,050,712 A | * | 4/2000 | Burton ...................... 362/529 |
| 6,082,882 A | * | 7/2000 | Akiyama et al. ........... 362/524 |
| 6,247,834 B1 | | 6/2001 | Suehiro |
| 6,910,789 B1 | * | 6/2005 | Tanaka et al. .............. 362/514 |

* cited by examiner

*Primary Examiner*—Thomas M. Sember
*Assistant Examiner*—Adam C Rehm
(74) *Attorney, Agent, or Firm*—Koda & Androlia (57) ABSTRACT

A vehicle headlamp in which a light source unit in a lamp body is tiltably supported by an aiming mechanism and aiming is carried out by turning a bevel gear of an aiming screw provided outside the lamp body. The bevel gear is covered by a synthetic resin cap, and the cap is formed with an opening into which a screwdriver is to be inserted, and a lid is continuously formed in the peripheral edge portion of the opening, so that once the lid 46 is folded and covers the opening, the headlamp becomes to comply with the visual aiming specification that prohibits users to perform aiming adjustment of the light source unit.

6 Claims, 10 Drawing Sheets

CAP FOR VEHICLE HEADLAMP AIMING MECHANISM

BACKGROUND OF THE INVENTION

1. Technical Field

The present invention relates to a vehicle headlamp and more particularly to a vehicle headlamp that has a light source unit aiming mechanism.

2. Description of the Related Art

One of the specifications employed in a vehicle headlamp is a "visual aiming specification." According to the visual aiming specification, though the light source unit is accommodated in the lamp body and is tiltably supported by an aiming mechanism, and an aiming screw turning operation portion for tiltably adjusting the light source unit is provided outside the lamp body, the aiming screw turning operation portion is covered by, for instance, a cap so that the adjustment of aiming of the light source can be conducted only by auto manufacturers and such by users (vehicle owners) is inhibited.

Figure 9:
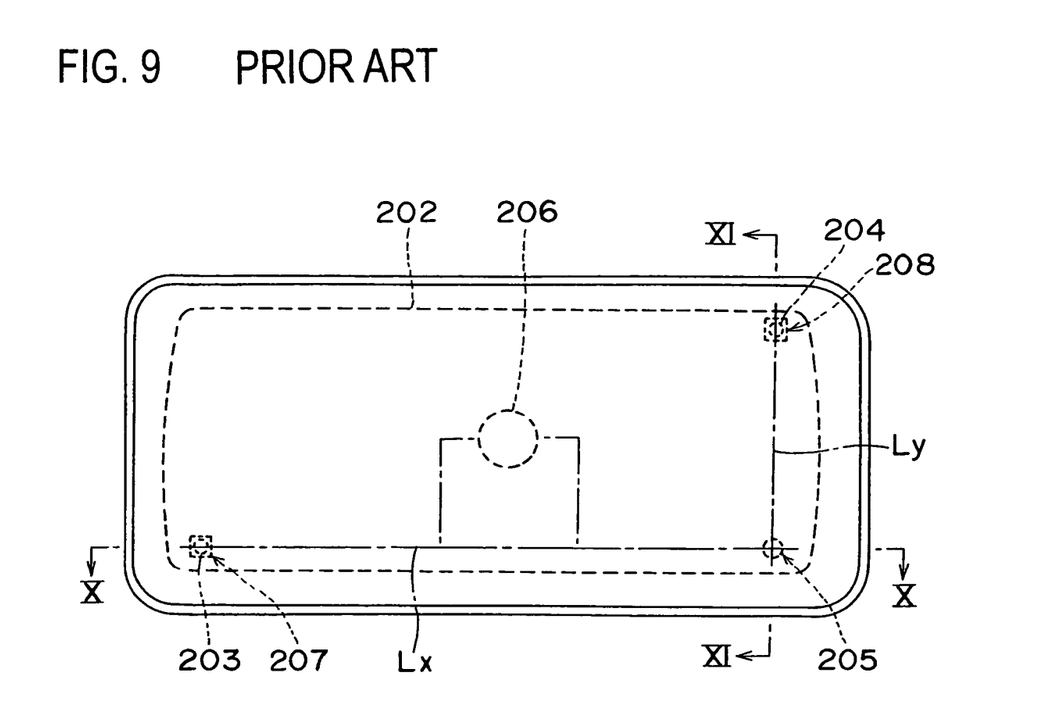
FIG. 9 is a front view of a prior art headlamp.
Figure 10:
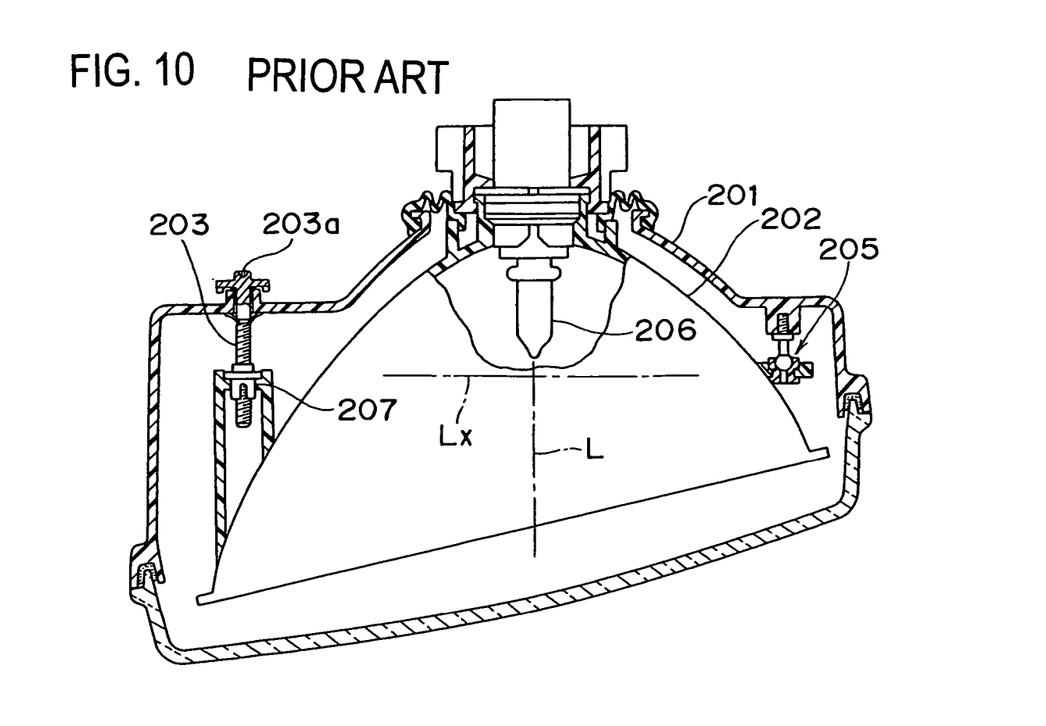
FIG. 10 is a longitudinal sectional view thereof taken along the line X—X in FIG. 9.
Figure 11:
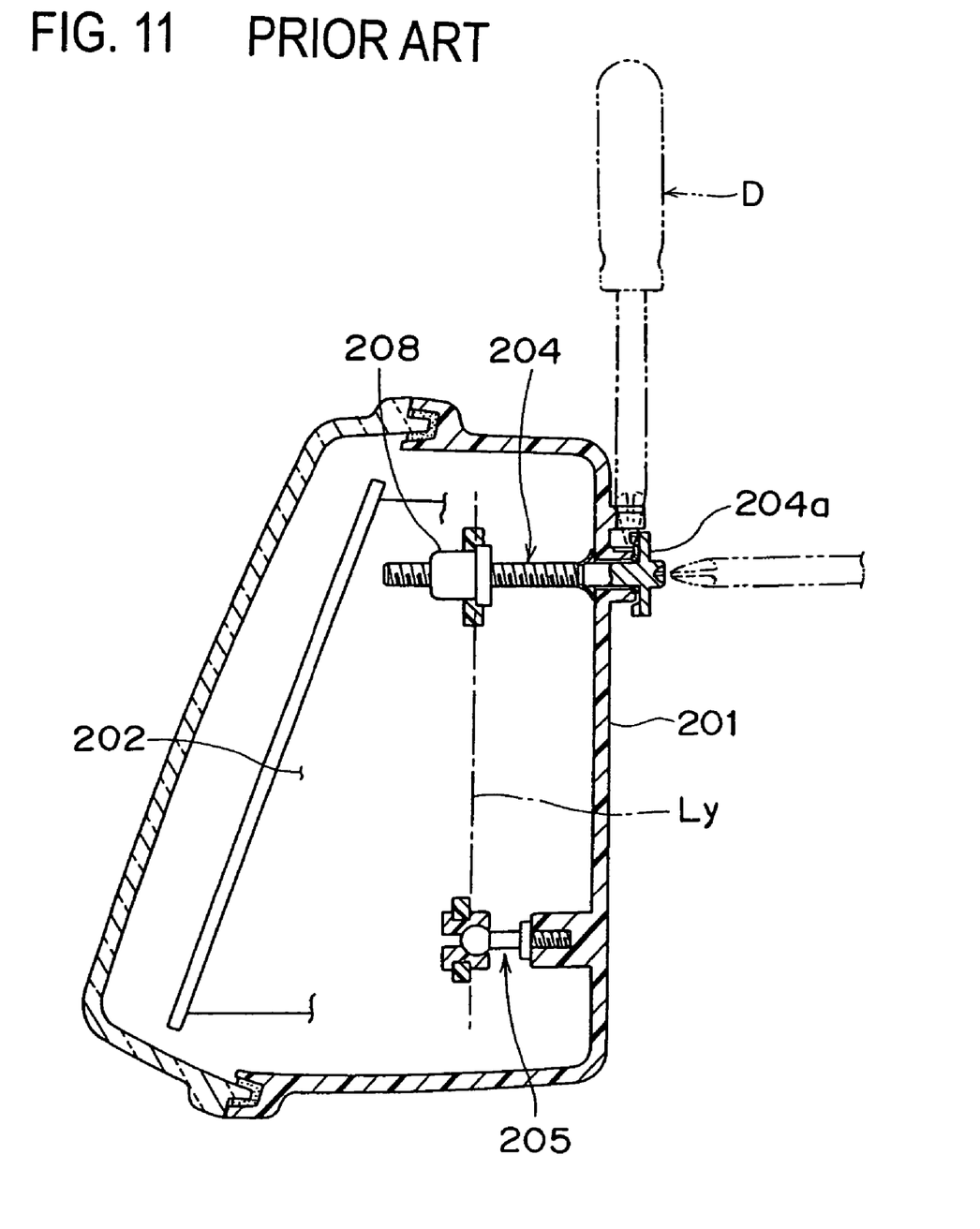
FIG. 11 is a horizontal sectional view thereof taken along the lines XI—XI in FIG. 9.

In the typical headlamp that complies with the visual aiming specification, as shown in FIGS. 9 to 11, a reflector 202 that has a bulb 206 as its light source is supported by an aiming mechanism that is comprised of a ball joint 205 and two aiming screws 203 and 204 extending longitudinally through a lamp body 201. The aiming screws 203 and 204 are respectively provided so as to be turned at locations where they penetrate the lamp body 201. Bearings of the reflector 202, which are to be supported by the aiming screws 203 and 204, are tightly fitted to a bracket on the reflector 202 side and are constructed as nut members 207 and 208 into which the aiming screws 203 and 204 are screwed, respectively.

In this structure, when the aiming screws 203 and 204 are turned, the nut members 207 and 208 are moved forward or backward along the aiming screws 203 and 204, and the reflector 202 tilts around the horizontal axis Lx and the vertical axis Ly, respectively. The light axis of the lamp is thus tiltably adjusted (aimed) vertically and laterally. Turning operation portions 203a, 204a for making the turning operation of the screws 203 and 204 possible by engagement of an aiming tool such as a screwdriver D or an Allen wrench are respectively formed at the rear end portions of the aiming screws 203 and 204 that extend behind the lamp body 201.

Figure 12:
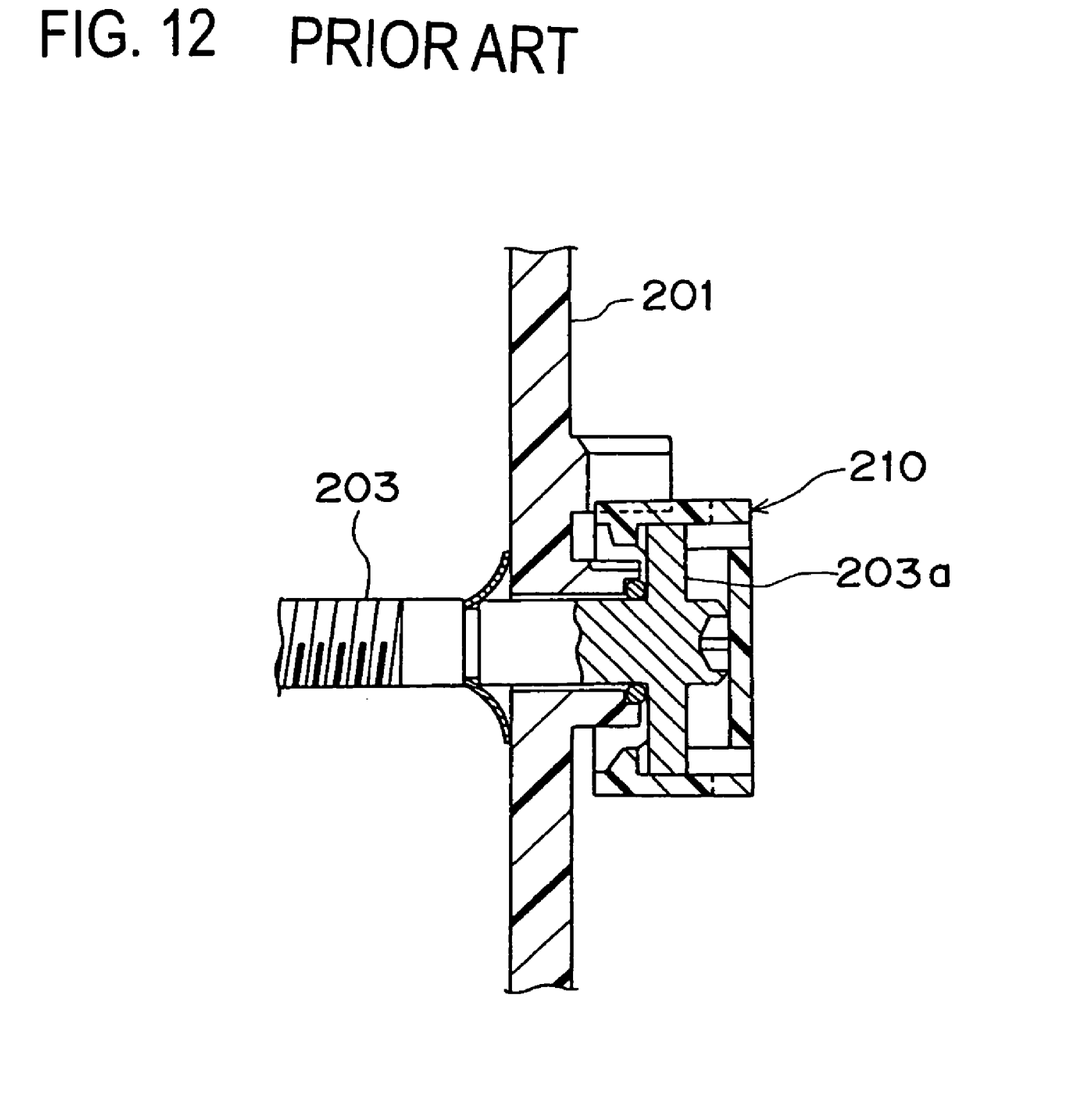
FIG. 12 shows, in cross-section, the area around the turning operation portion of the aiming screw that is fitted with a cap.

Auto manufacturers make shipment of their vehicles after having the headlamps structured above installed in the vehicles. Before the vehicles are shipped, aiming in the headlamps is carried out by, for example, engaging the screwdriver D with the turning operation portions 203a, 204a. However, vehicle headlamps for, for instance, the United States must meet a specification that does not allow users to perform lateral aiming. Thus, depending upon the destination countries, the visual aiming specification needs to be adopted for the headlamps; and for these destination countries, a construction of a headlamp that meets the visual aiming specification is obtained by, after the aiming has been completed, covering the turning operation portion 203a with a hardly removable cap 210 and thus enveloping the turning operation portion 203a as shown in FIG. 12, as disclosed in Japanese Patent Application Laid-Open (Kokai) No. H11-70832 (paragraphs 0076 to 0089, FIGS. 35 to 40).

However, according to the prior art as described above, since the turning operation portion needs to be covered by the cap 210 after aiming has been carried out, a headlamp manufacturer needs to send a headlamp and a cap as a pair (or separately) to auto manufacturers, which is very troublesome. The auto manufacturer, on the other hand, faces considerable troublesomeness because the cap, which is small in size, must be kept in safe custody so as not to be lost. In addition, the operation of covering the turning operation portion with the cap by workers who need to insert hands into a narrow space behind the lamp body is quite bothersome.

BRIEF SUMMARY OF THE INVENTION

The present invention is to overcome the problems stated above.

It is an object of the present invention to provide a vehicle headlamp that allows aiming operation to be done with an aiming screw turning operation portion covered by a cap and that can be easily changed to a headlamp complying with a visual aiming specification.

The above object is accomplished by a unique structure of the present invention for a vehicle headlamp that includes a light source unit, which is provided inside the lamp body of the vehicle headlamp and is tiltably supported by an aiming mechanism, and an aiming screw turning operation portion, which is provided outside the lamp body and is turned to carry out aiming of the light source; and in the present invention, a cap that covers the aiming screw turning operation portion, thus making the vehicle headlamp comply with a visual aiming specification, is provided; and this cap is formed with an opening into which an aiming tool for turning the aiming screw turning operation portion is inserted, and a lid provided in the peripheral edge portion of the opening, the lid being continuously formed via a hinge portion and closing the opening when folded at the hinge portion.

In this structure, though the cap, with the lid left unfolded, is attached to the turning operation portion and the turning operation portion is covered by the cap, the aiming screw turning operation portion can be turned by inserting an aiming tool (e.g., a Phillips screwdriver) from the opening provided in the cap and engaging the aiming tool with the turning operation portion in the cap. Aiming can be thus performed. After aiming is finished, the opening of the cap is closed by folding the lid, making it impossible to insert the aiming tool in the turning operation portion in the cap, thus realizing the visual aiming specification. A means for holding the lid folded so as to close the opening of the cap can be obtained by way of providing a convex-concave lance engaging portion between the lid and the peripheral edge portion of the opening.

Since the aiming operation can be performed with the aiming screw turning operation portion covered by the cap, a headlamp manufacturer can ship the headlamp to auto manufacturers after having the turning operation portion covered by the cap in advance.

For auto manufacturers who receive such headlamps, it is only necessary to keep and manage the headlamps that have the turning operation portion covered with the cap; and the visual aiming specification is achieved by simply folding the lid of the cap at the hinge portion, and such an operation can be easily performed even in the narrow space behind the lamp body.

In addition, in vehicle headlamp of the present invention, the lid for closing the opening in the cap has a protruding portion so that a folding force is applied to this protruding portion when the lid is folded at the hinge portion.

With this structure, the lid can be smoothly folded by, for example, pinching the protruding portion with fingertips or pushing the protruding portion with a rod member.

Furthermore, in the vehicle headlamp of the present invention, the turning operation portion is comprised of an annular gear, the cap is a cylindrical body that includes a cylindrical portion and a bottom, the opening is formed in the cylindrical portion of the cap, and the lamp body has a pair of protrusions that engages the outside surfaces of the peripheral edge portions of the opening of the cap.

In this structure, since the outside surface of the peripheral edge portion of the opening of the cap are engaged with the pair of protrusions that are formed on the lamp body, the circumferential positioning of the cap with respect to the turning operation portion (the annular gear) can be made easily.

Further, even if an attempt is made to insert an aiming tool such as a screwdriver or the like into the cap by forcing the aiming tool into the gap between the peripheral edge portion of the opening and the folded lid, the aiming tool cannot enter into the cap because the peripheral edge portion of the opening, which is backed up by the protrusions formed on the lamp body, is substantially undeformable in such a direction as to widen the opening. In other words, the visual aiming specification is assured, and users are prohibited from performing the aiming adjustment.

In addition, in the vehicle headlamp of the present invention, the lid is substantially the same in size as the opening and is formed in the shape of a tongue strip that extends substantially perpendicularly to the opening, convex (projecting) portions are formed in the right and left lateral edges of the lid, a pair of right and left rising walls are formed at the peripheral edge portion of the opening so as to extend substantially perpendicularly to the lid, and concave (recessed) portions are formed in the rising walls so that the convex portions of the lid come into an engagement with the concave portions when the lid is folded.

In this structure, when the lid is folded at the hinge portion, the convex portions of the lid slide toward the opening along the rising walls of the cap and come to engage with the concave portions of the rising walls while spreading the rising walls toward the outside of the opening, and the lid is held to close the opening. The rising walls that thus hold the lid function as a guide when the lid is folded. The rising walls further function as an aiming tool insertion guide when the aiming operation is performed. As a means for the convex-concave lance engagement between the lid and the rising walls, the lid may have concave portions while the rising walls have convex portions. However, forming of concave portions in the lateral edges of the lid causes, for instance, the thickness of the lid to increase. In other words, concave portions cannot be easily formed at the edges of the lid that is normally thin. Considering the cap to be made by injection molding of resin, it is preferable that the lid have convex portions and the rising walls have concave portions; and this arrangement is more advantageous in that a mold can be worked easily.

BRIEF DESCRIPTION OF THE DRAWINGS

FIG. 6(*a*) is a top view of the screwdriver guide and the cap engaging protrusion that are formed on the lamp body with the cap shown by imaginary (dashed) lines, and FIG. 6(*b*) is a front view thereof;

FIG. 7(*a*) is a front perspective view of the cap that covers the turning operation portion of the aiming screw, and FIG. 7(*b*) is a rear perspective view thereof;

DETAILED DESCRIPTION OF THE INVENTION

The present invention will be described below with reference to the accompanying drawings.

Figure 2:
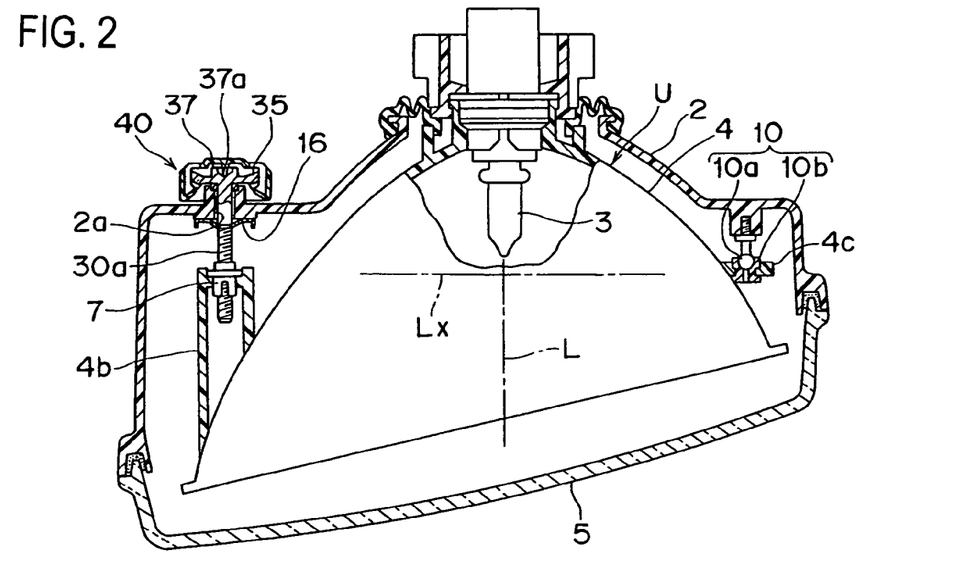
FIG. 2 is a horizontal sectional view of the headlamp taken along the line II—II in FIG. 1.
Figure 3:
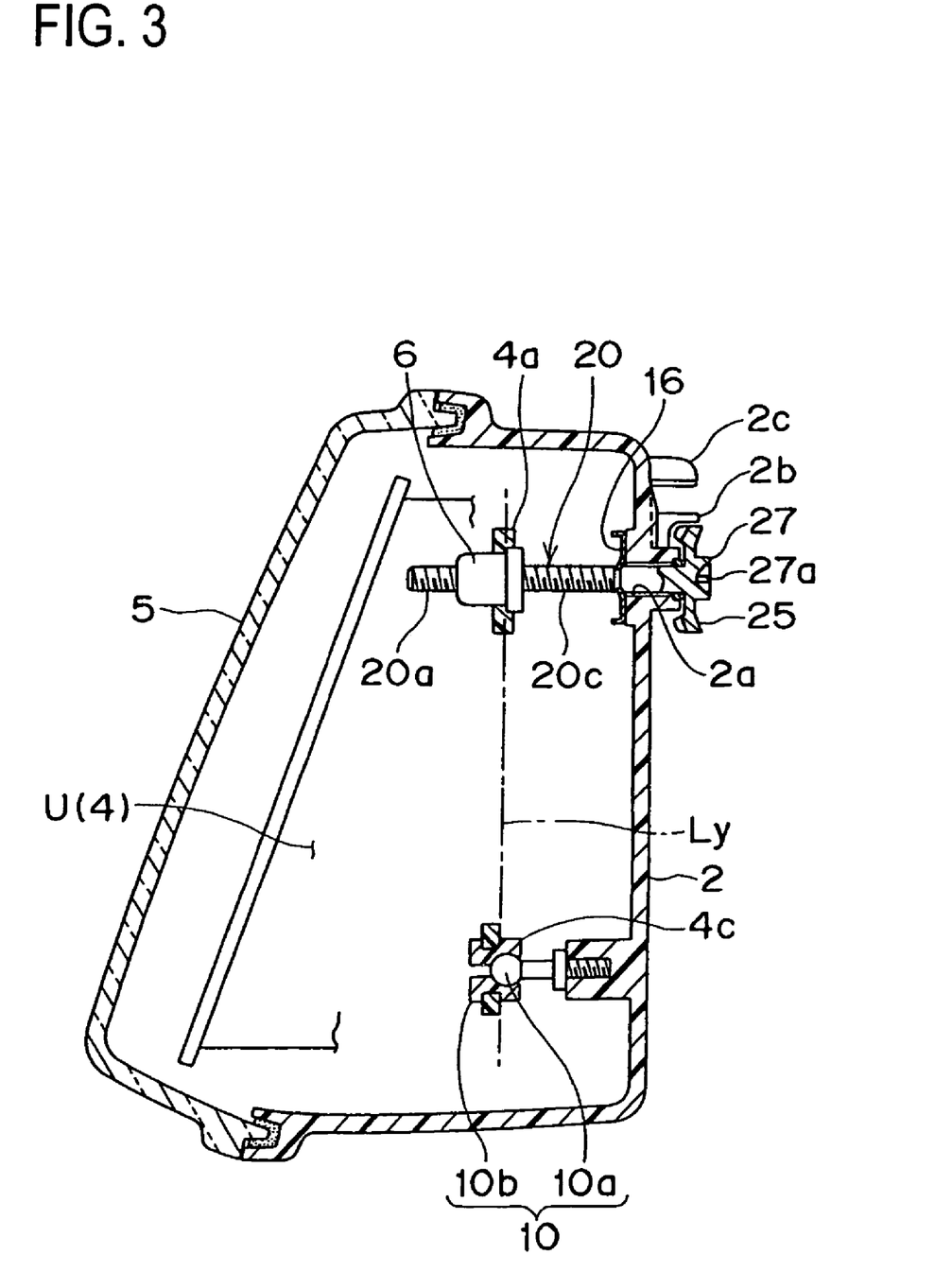
FIG. 3 is a longitudinal sectional view of the headlamp taken along the line III—III in FIG. 1.
Figure 4:
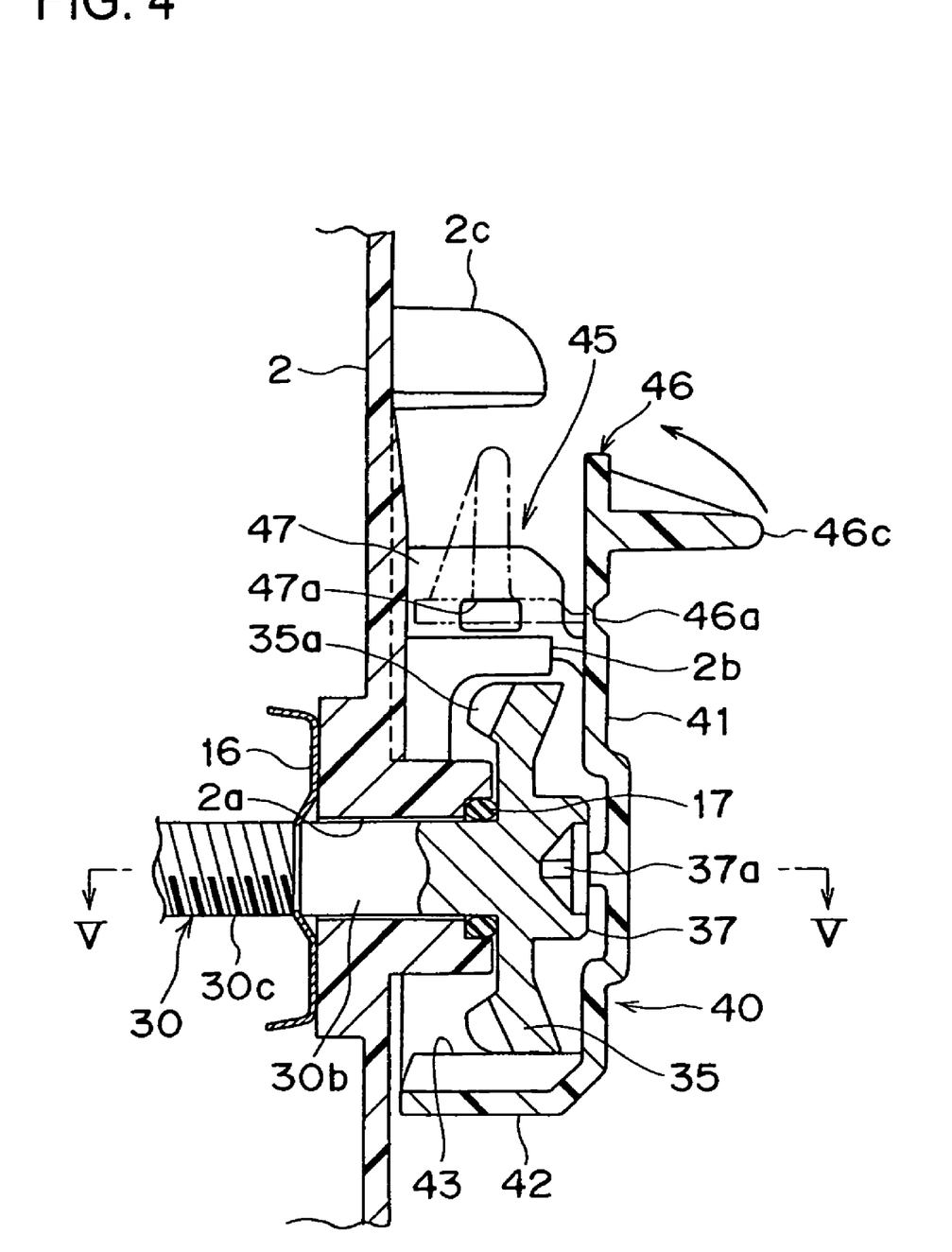
FIG. 4 shows, in cross-section, the area around the turning operation portion of the right or left aiming screw that is covered by a cap.

In FIGS. 2 through 4 of the accompanying drawings, the reference numeral 2 denotes a container-shaped lamp body that is made of synthetic resin. A light source unit U (including a parabolic reflector 4 into which a bulb 3, the light source, is tightly inserted) is disposed inside the lamp body 2. A front lens 5 is mounted to the front opening portion of the lamp body 2, so that an integral-type headlamp is obtained.

The light source unit U (in particular, its reflector 4) is vertically and laterally supported in a tiltable fashion by an aiming mechanism, which is composed of a pair of aiming screws 20, 30, nut members 6, 7, and a ball joint 10. The aiming screws 20, 30 extend longitudinally and horizontally in screw insertion holes 2*a* that are formed in the back wall of the lamp body 2. The nut members 6, 7, into which the aiming screws 20, 30 are screwed respectively, are tightly fitted in brackets 4*a*, 4*b* that protrude from the back face of the reflector 4. The ball joint 10 is interposed between the reflector 4 and the lamp body 2.

The ball joint 10 is composed of a ball portion 10*a* and a ball receiving portion 10*b*. The ball portion 10*a* protrudes from the interior of the lamp body 2. The ball receiving portion 10*b* is tightly fitted in a bracket 4*c* that protrudes from the reverse side of the reflector 4, and it holds the ball portion 10*a* therein.

The aiming screws 20, 30 are turnably supported in the screw insertion holes 2*a* respectively, so that the screw thread portions 20*a*, 30*a* and screw shaft portions 20*b*, 30*b* of the respective the aiming screws 20, 30 extend in the forward and backward directions of the lamp body 2, respectively.

The reference numeral 16 denotes a push-on fixture that holds the aiming screws 20, 30 to prevent them from falling off. Due to the spring urging force of the push-on fixtures 16, the aiming screws 20, 30 are held so that the base end portion of a bevel gear 25 integrated with the screw shaft portion 20*b* of the aiming screw 20 and the base end portion of a bevel gear 35 integrated with the screw shaft portion 30*b* of the aiming screw 30 are respectively pressed against the peripheral edge portions of the screw insertion holes 2*a*.

Figure 5:
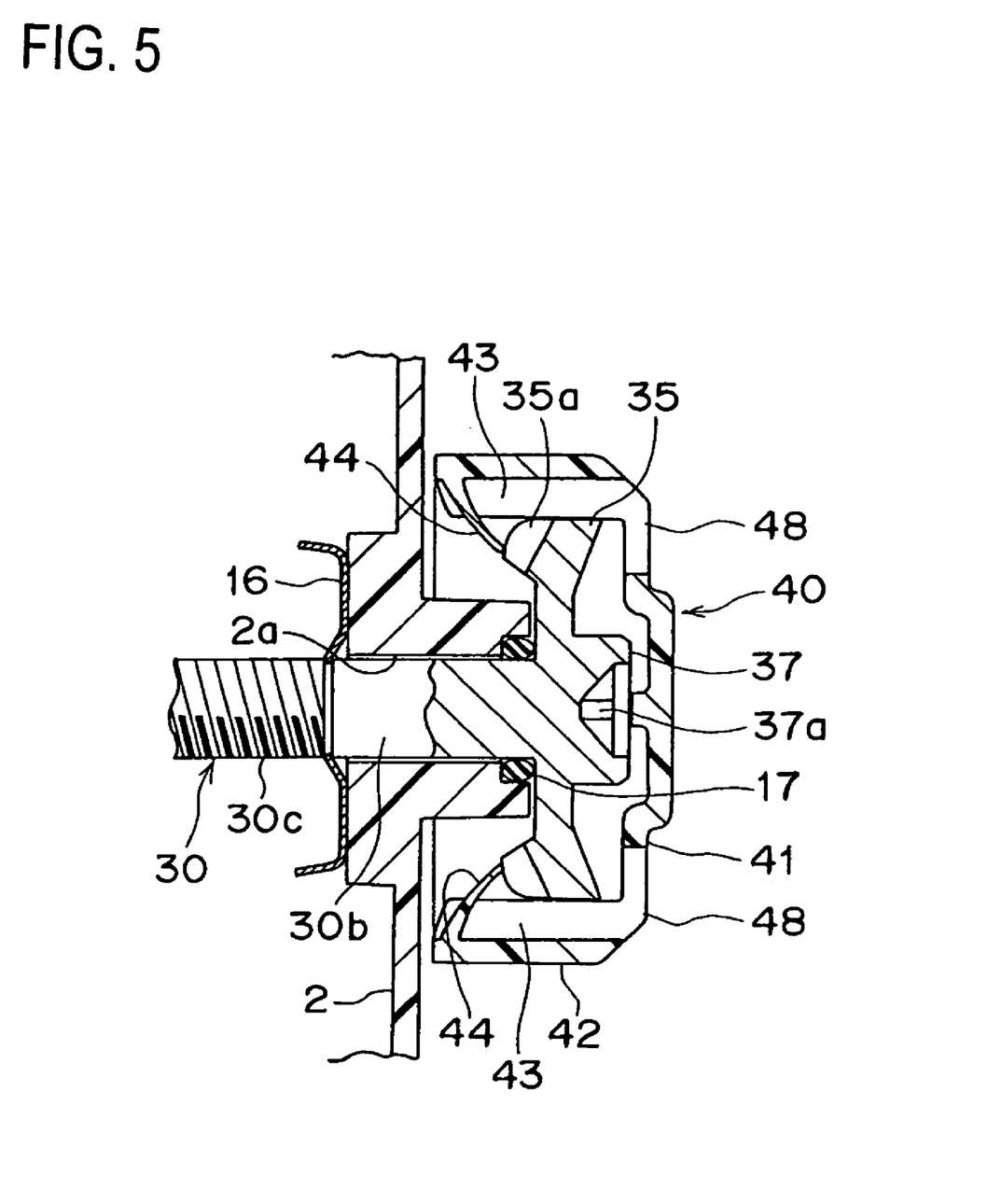
FIG. 5 shows, in cross-section taken along the line V—V of FIG. 4, the area around the turning operation portion of the right or left aiming screw that is covered by the cap.

In FIGS. 4 and 5, the reference numeral 17 denotes an O-ring that seals the screw insertion hole 2*a*.

The forward-extending screw thread portions 20a, 30a of the aiming screws 20, 30 are screwed into the nuts members 6, 7, respectively. A bevel gear 25, with which a tooth portion of a screwdriver serving as an aiming tool as well can be engaged, is integrated with the screw shaft portion 20b that protrudes backward from the lamp body 2. Likewise, the bevel gear 35, with which a tooth portion of a screwdriver D serving as an aiming tool as well can be engaged, is integrated with the screw shaft portion 30b that protrudes backward from the lamp body 2. Hexagonal bolt head portions 27, 37, with which the tooth portion of the screwdriver D as an aiming tool, a spanner or a wrench can be engaged, are formed in the central portions of back faces of the bevel gears 25, 35, respectively. Cruciform grooves 27a, 37a, with which the tooth portion of the screwdriver D can be engaged, are formed in the end faces of the hexagonal bolt head portions 27, 37 of the bevel gears 25, 35, respectively.

In FIGS. 3, 4, 5 and 6(a), the reference numerals 2b, 2c denote bifurcated screwdriver guides that protrude from the lamp body 2 and extend above the bevel gears 25, 35, respectively. If the screwdriver D is inserted from above along the screwdriver guides 2b, 2c, the tooth portion (or the tip end) of the screwdriver D engages the tooth portions 25a, 35a of the bevel gears 25, 35. The screwdriver guide 2b is provided directly above and close to the bevel gears 25, 35 so that it does not become hindrance to a later-described cap 40 to be covered on the bevel gears 25, 35, and it is located inside the installed cap 40 (see FIG. 4). The bifurcated screwdriver guide 2b engages the inside of the inner peripheral edge portion of an opening 45 of the cap 40, so that it functions also as a guide when covering the bevel gears with the cap 40.

Figure 1:
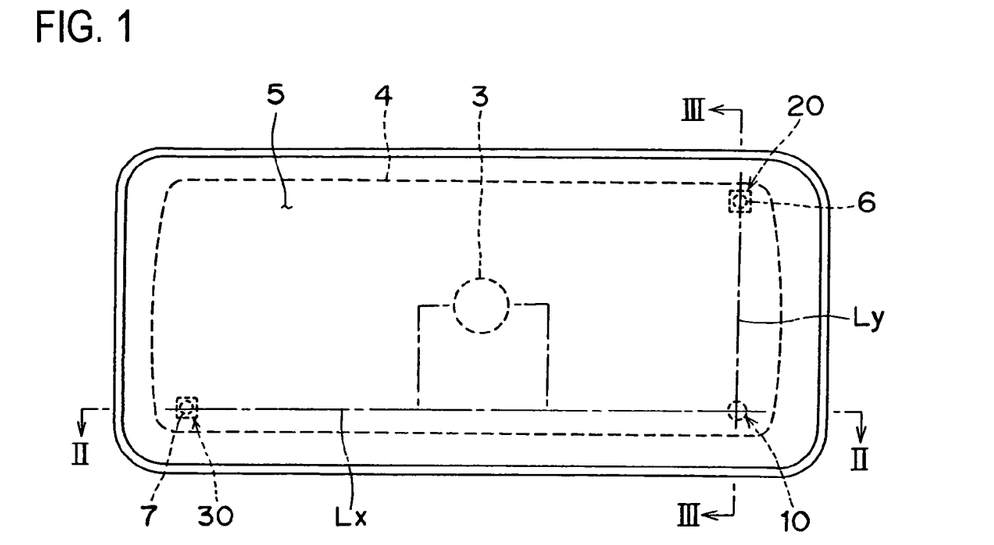
FIG. 1 is a front view of the vehicle headlamp according to the first embodiment of the present invention.

When the bevel gears 25, 35 (the aiming screws 20, 30) are/is turned by, for instance, the screwdriver D, the nut members 6, 7 are/or moved forward or backward along the screw thread portions 20a, 30a of the aiming screws 20, 30, respectively, so that the light source unit U (the reflector 4) is tilted vertically and/or laterally. In other words, the aiming screw 20 constitutes a vertical aiming screw for tilting (vertically tilting) the light source unit U around the horizontal axis Lx (see FIG. 1) which connects the nut member 7 and the ball joint 10, and the aiming screw 30 constitutes a lateral aiming screw for tilting (laterally tilting) the light source unit U around the vertical axis Ly that connects the nut member 6 and the ball joint 10. Thus, the light axis L of the headlamp (the light source unit U) can be aimed at any desired directions when the aiming screws 20, 30 are/is turned.

The reference numeral 40 is a synthetic resin cap that covers the bevel gear 35 of the aiming screw 30.

More specifically, as seen from FIGS. 4, 5, 7(a) and 7(b), the cap 40 is a cylindrical body with a bottom, comprising a disk-shaped top board portion 41 and a cylindrical portion 42. The disk-shaped top board portion 41 covers the end face of the bevel gear 35; and the cylindrical portion 42 substantially vertically extends from the outer peripheral edge of the top board portion 41 and covers the outer periphery of the bevel gear 35. Longitudinal ribs 43, which match the outer peripheral edge of the bevel gear 35, are formed on the inner surface of the cylindrical portion 42 by being circumferentially arranged at equal intervals. A flexible, tongue-strip-shaped elastic hook 44 that holds the tooth portion 35a of the bevel gear 35 is extensively formed between any two circumferentially adjacent ones of the longitudinal ribs 43. The cap 40 thus can be fitted (attached in a covering manner) on the bevel gear 35 from its back face side by one-touch operation.

Figure 7A:
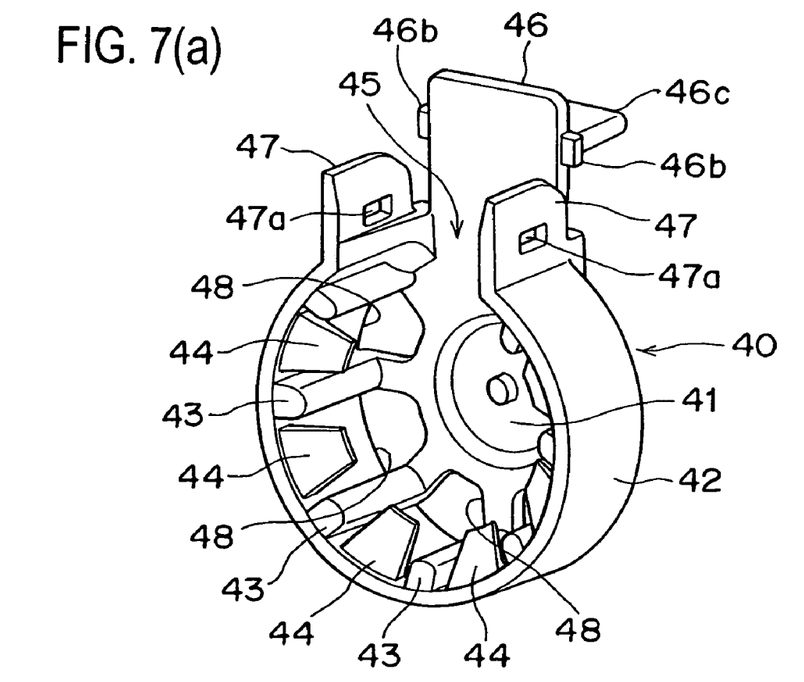
Figure 7B:
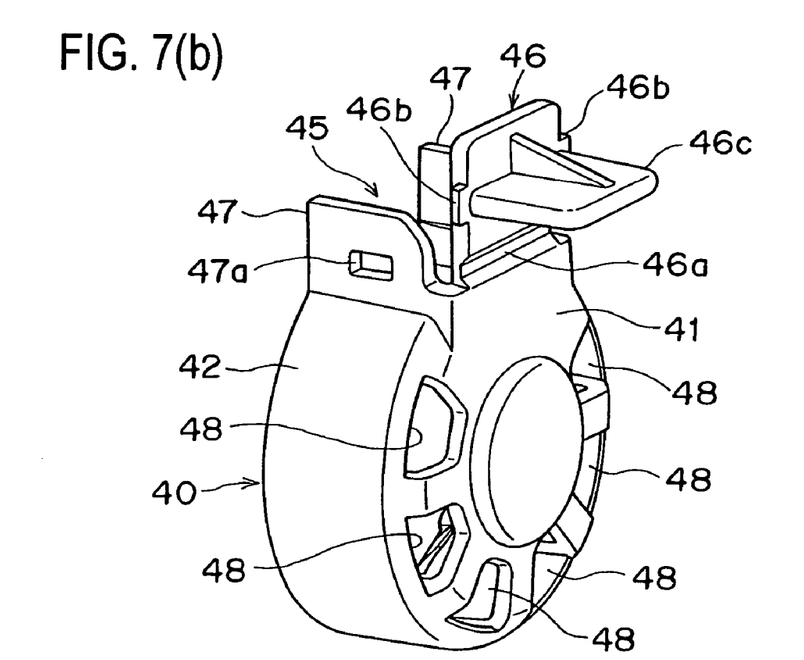

The cap 40 has the opening 45 in its cylindrical portion 42 so that the screwdriver D is brought into the inside of the cap 40; and a lid 46 for closing the opening 45 is provided in the peripheral edge portion of the opening 45. More specifically, the cylindrical portion 42 of the cap 40 is formed with the rectangular opening 45 as a notch that extends from the front opening side of the cap 40 to the top board portion 41. A pair of right and left rising walls 47 are formed in the opening-side edge portion of the cylindrical portion 42 of the cap 40 so as to sandwich the opening 45. The rectangular lid 46, which is perpendicular to the rising walls 47 and flush with the top board portion 41, is continuously formed at a position, which faces the opening 45 of the top board position 41, via a thin-walled hinge portion 46a as a folding portion. Right and left lateral edge portions of the lid 46 are respectively formed with claws 46b as convex portions, while the rising walls 47 are respectively formed with holes 47a as concave portions so that the claws 46b of the lid 46 are engaged with the holes 47a of the rising walls 47, respectively.

Figure 8:
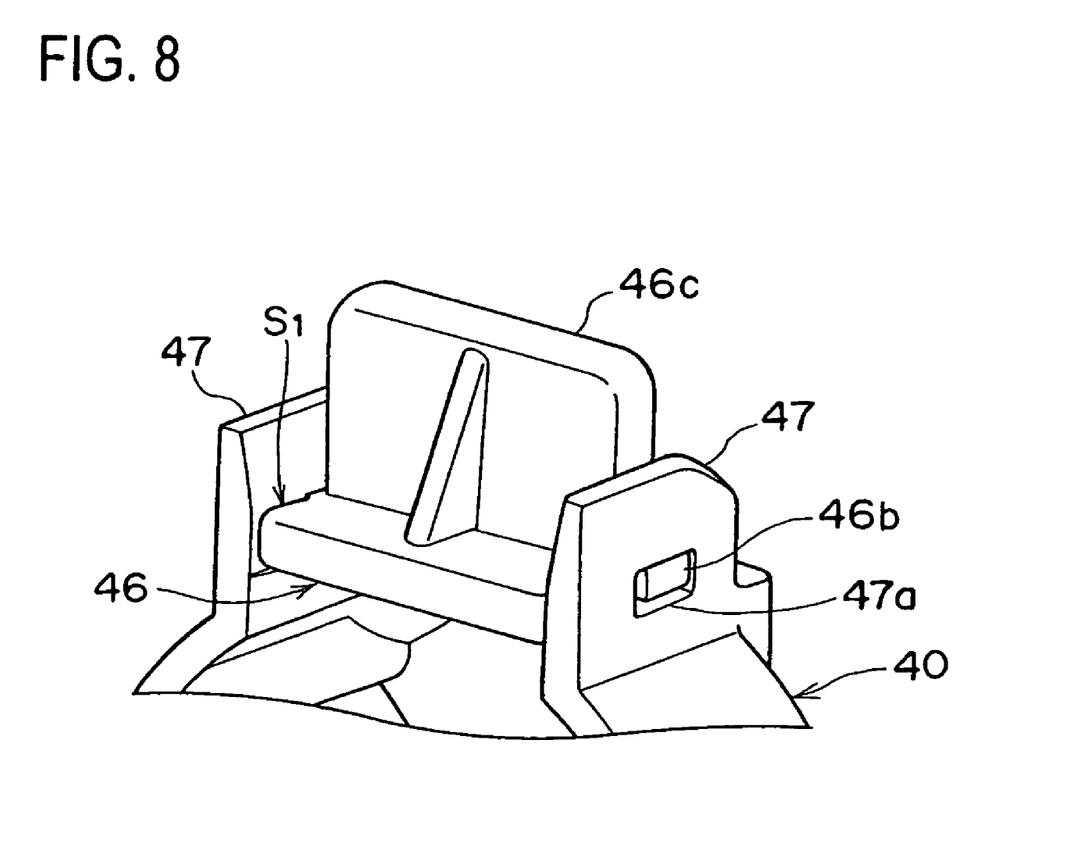
FIG. 8 shows the opening of the cap with the lid folded.

When the lid 46 is folded at the hinge portion 46a toward the opening 45 as shown by curved arrow in FIG. 4, the claws 46b come into an engagement with the holes 47a and fixed so that the claws 46b does not disengage from the holes 47a. Thus, as shown by imaginary lines in FIG. 4 and as can be seen from FIG. 8, the folded lid 46 extends along the screwdriver guide 2b and is held to close the opening 45.

The lid 46 is formed with a protruding pinching portion 46c, which is a point of application of a force when the lid is folded at the hinge portion. For example, by pinching the pinching portion 46c with fingertips, the lid 46 is easily folded along the hinge portion 46a.

Figure 6A:
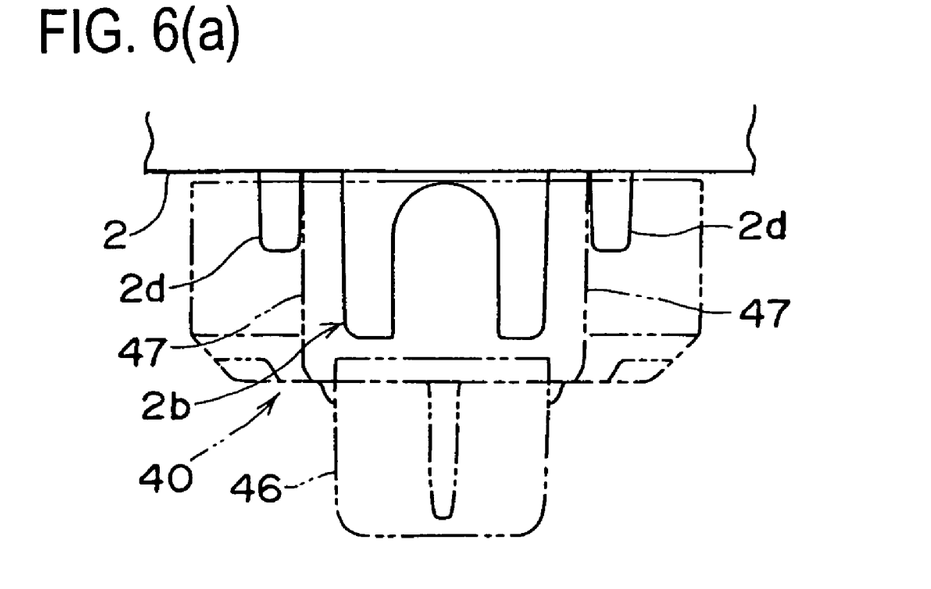
Figure 6B:
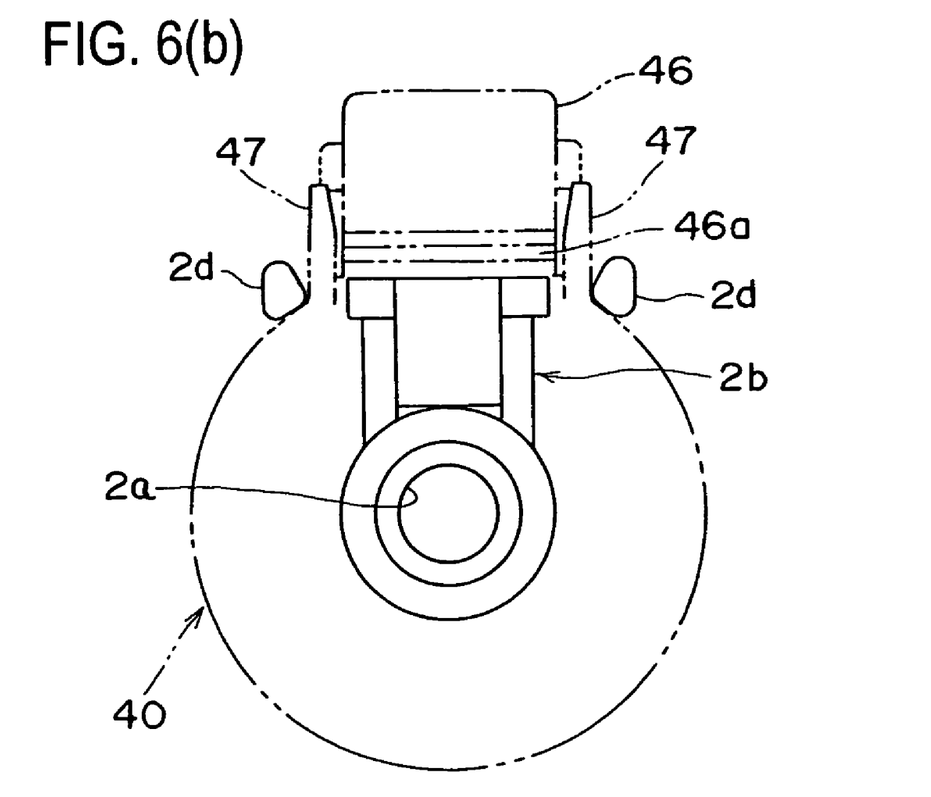

As seen from FIGS. 6(a) and 6(b), a pair of protrusions 2d, which respectively engage the outside surfaces of the root areas of the rising walls 47 of the cap 40 that covers the annular gear 35, are provided outside the screwdriver guide 2b and above the screw insertion hole 2a on the back of the lamp body 2. When the rising walls 47 of the cap 40 are engaged at their inside and outside surfaces with the screwdriver guide 2b and protrusions 2d, the cap 40 is assuredly positioned circumferentially with respect to the annular gear 35. In other words, when covering the bevel gear 35 with the cap 40, the cap 40 is thrust or pushed such that the rising walls 47 engage the protrusions 2d; as a result, the bevel gear 35 is covered by the cap 40, and the cap 40 is securely fixed with respect to the lamp body 2.

Even if an attempt is made to insert the screwdriver D into the cap 40 by forcing the screwdriver D into a gap S1 (see FIG. 8) between one of the rising walls 47 and the lid 46 after the bevel gear 35 is covered by the cap 40 with the lid 46 folded to close the opening 45, the attempt will not be successful at all. The reason for this is that as seen from FIG. 4, the screwdriver guide 2b extends along the lower surface of the lid 46 which is folded; as a result, there is no apprehension that the lid 46 is pushed into the opening; and in addition, as seen from FIGS. 6(a) and 6(b), since the rising walls 47 are backed up or supported by the protrusions 2d that extend from the lamp body 2, it is most unlikely that the rising walls 47 deform in a direction that widens the opening 45. Thus, in this visual aiming specification in which the lid 46 is folded, it is virtually impossible to force the screwdriver D into the cap 40, and thus aiming by a user is assuredly prohibited.

The cap 40 is an integral compact made of a synthetic resin. Cavities 48 for molding the reverse sides of the elastic hooks 44, which are liable to become undercut portions in the molding step of the cap, are formed in the top board portion 41 at a position that corresponds to the elastic hooks 44.

As seen from the above, when it is necessary to comply with the specification that allows users to perform vertical aiming and lateral aiming as in the case of headlamps for, for instance, European countries and Japan, headlamps according to the European and Japanese specification can be obtained if an auto manufacturer leaves the bevel gears 25, 35 on the back of the headlamp uncovered by the caps 40. As a result, the light axis of the headlamp can be adjusted vertically and laterally by users in, for instance, European countries and Japan, with, for instance, screwdrivers.

On the other hand, when it is necessary that headlamps comply with the visual aiming specification that does not allow the right and left aiming screws to be turned by users as in, for instance, the United States, headlamps are delivered from a lamp manufacturer to auto manufactures with the bevel gear 35 covered with the cap 40 (with the lid 46 left unfolded) in advance. Auto manufacturers perform the vertical aiming and/or lateral aiming by, for instance, screwdrivers prior to or after installing the headlamps in vehicles, fold the lid 46 to close the opening 45 of the cap 40, and then make shipment of the vehicles. In other words, auto manufacturers can make shipment of vehicles mounted with headlamps that comply with the visual aiming specification that inhibits users to perform lateral (right and left) aiming.

Auto manufacturers can receive shipment of headlamps that have the bevel gears 25, 35 both covered by the caps 40 (with the lid 46 left unfolded) in advance, so that it, after conducting aiming adjustment, make shipment of the vehicles with or without closing the opening 45 of the cap 40 with the lid 46 in accordance with the specifications required by each destination country.

In the above-described embodiments, the screwdriver guides 2b, 2c guide the screwdriver D into the opening 45 of the cap 40. In the structure that has no screwdriver guides 2b, 2c, however, the rising walls 47 can function as a screwdriver guide.

In the above embodiments, the present invention is described on a vehicle headlamp. However, the present invention should not be limited to headlamps. The present invention is applicable to other vehicle headlights such as fog lamps.

As seen from the above, according to the vehicle headlamp of the present invention, the headlamp can be transferred from headlamp manufacturers to auto manufacturers with the turning operation portion covered with a turn inhibiting cap. Accordingly, headlamp manufacturers can easily transfer the headlamps, and auto manufacturers can easily execute storing and management of the headlamps.

Further, the visual aiming specification in which the opening of the cap is closed can be easily achieved by simply folding the lid at the hinge portion. Accordingly, auto manufacturers can easily make headlamps comply with the visual aiming specification after making the adjustment of the aiming angles.

In addition, according to the present invention, since the folding of the lid is easily performed, the visual aiming specification can be smoothly achieved after performing the aiming.

Furthermore, according to the present invention, a headlamp that complies with the visual aiming specification that allows users absolutely no chance of performing the aiming adjustment is provided.

Furthermore, according to the present invention, since an aiming tool can be easily engaged with the turning operation portion of the aiming screw during the aiming operation, aiming is carried out easily; and once the lid is folded and the opening is closed, the visual aiming specification of the lamp is assured; and since the lid can be folded easily, the shift to the visual aiming specification is smoothly done.

The invention claimed is:

1. A vehicle headlamp comprising: a light source unit, which is provided inside a lamp body of said vehicle headlamp and is tiltably supported by an aiming mechanism, and an aiming screw turning operation portion, which is provided outside the lamp body and is turned to carry out aiming of said light source unit;
   a cap that is separate from the lamp body and mounted to cover the aiming screw turning operation portion, thus making said vehicle headlamp comply with a visual aiming specification; and
   said cap is formed with an opening into which an aiming tool for turning the aiming screw turning operation portion is inserted, and a lid provided in a peripheral edge portion of the opening, the lid being continuously formed via a hinge portion and closing the opening when folded at the hinge portion.

2. The vehicle headlamp according to claim 1, wherein said lid that closes said opening is provided with a protruding portion to which a force is applied when the lid is folded at the hinge portion.

3. The vehicle headlamp according to claim 1, wherein:
   said aiming screw turning operation portion is comprised of an annular gear,
   said cap is a cylindrical body comprised of a cylindrical portion and a bottom,
   said opening is formed in a cylindrical portion of the cap, and
   said lamp body is provided with a pair of protrusions that engage with the outside surfaces of the peripheral edge portion of the opening of the cap.

4. The vehicle headlamp according to claim 3, wherein:
   said lid substantially matches said opening in size and is formed in a shape of a tongue strip that extends substantially perpendicularly to the opening,
   said lid is formed with convex portions,
   said peripheral edge portion of said opening is formed with a pair of rising walls that extend substantially perpendicularly to the lid, and
   the rising walls are provided with concave portions with which the convex portions of the lid are engaged when the lid is folded.

5. The vehicle headlamp according to claim 2, wherein:
   said aiming screw turning operation portion is comprised of an annular gear,
   said cap is a cylindrical body comprised of a cylindrical portion and a bottom,
   said opening is formed in a cylindrical portion of the cap, and
   said lamp body is provided with a pair of protrusions that engage with the outside surfaces of the peripheral edge portion of the opening of the cap.

6. The vehicle headlamp according to claim 5, wherein:
   said lid substantially matches said opening in size and is formed in a shape of a tongue strip that extends substantially perpendicularly to the opening,
   said lid is formed with convex portions,
   said peripheral edge portion of said opening is formed with a pair of rising walls that extend substantially perpendicularly to the lid, and
   the rising walls are provided with concave portions with which the convex portions of the lid are engaged when the lid is folded.

* * * * *